(12) United States Patent
Wagner

(10) Patent No.: US 6,796,402 B1
(45) Date of Patent: Sep. 28, 2004

(54) MUFFLER HAVING ISOLATED DUAL FLOW BAFFLE STRUCTURE

(76) Inventor: Dane Wagner, P.O. Box 190441, Anchorage, AK (US) 99519

( * ) Notice: Subject to any disclaimer, the term of this patent is extended or adjusted under 35 U.S.C. 154(b) by 0 days.

(21) Appl. No.: 10/417,578

(22) Filed: Apr. 17, 2003

(51) Int. Cl.[7] .............................. F01N 7/04; F28D 7/16
(52) U.S. Cl. ...................... 181/238; 181/239; 181/268; 181/272; 181/275; 165/165
(58) Field of Search ................................ 181/238–240, 181/249, 255, 264, 268, 269, 272, 275, 283, 282; 244/129.1, 118.5; 165/159, 160, 165

(56) References Cited

U.S. PATENT DOCUMENTS

| | | | | |
|---|---|---|---|---|
| 1,280,847 A | * | 10/1918 | Rinehart ...................... | 165/51 |
| 1,684,186 A | * | 9/1928 | Kysor ......................... | 165/51 |
| 1,700,841 A | * | 2/1929 | Graul .......................... | 165/51 |
| 1,706,979 A | * | 3/1929 | Kysor ......................... | 165/51 |
| 2,573,474 A | * | 10/1951 | Marx .......................... | 181/238 |
| 3,043,098 A | * | 7/1962 | Hannon ....................... | 181/272 |
| 3,794,139 A | * | 2/1974 | Hetherington et al. ...... | 181/238 |
| 3,997,002 A | * | 12/1976 | Baker et al. ................. | 165/154 |
| 4,476,838 A | * | 10/1984 | Fukumoto .................... | 123/556 |
| 4,621,677 A | * | 11/1986 | Suzuki et al. ............... | 165/135 |
| 4,694,894 A | * | 9/1987 | Kito et al. ................... | 165/135 |
| 5,238,370 A | * | 8/1993 | DiFlora ....................... | 181/269 |
| 5,325,666 A | * | 7/1994 | Rutschmann ............... | 422/171 |
| 5,371,331 A | * | 12/1994 | Wall ........................... | 181/227 |
| 5,496,975 A | * | 3/1996 | Wagner ....................... | 181/269 |
| 5,712,455 A | * | 1/1998 | Wagner ....................... | 181/238 |
| 6,382,347 B1 | * | 5/2002 | Gerber ........................ | 181/227 |

FOREIGN PATENT DOCUMENTS

JP 2003126810 A * 5/2003 ............. B09B/3/00

* cited by examiner

Primary Examiner—David Martin
Assistant Examiner—Edgardo San Martin
(74) Attorney, Agent, or Firm—Michael J. Tavella

(57) ABSTRACT

An exhaust that has two isolated baffle systems in one container. This allows the exhaust from one manifold to be muffled and exhausted independently of the other manifold's exhaust. Moreover, the muffler is the same size as existing mufflers, so that it fits into the space of the prior art mufflers. Using two independent muffler elements (baffles and outer covering cans) eliminates all of the problems discussed above and increases the engine horsepower without reducing efficiency. An outer shroud covers the two muffler elements and is also designed to act as a heat exchanger. Fresh air can be pulled through the muffler to be heated for cabin heat and for carburetor heat. The shroud has space around the muffler cans, through which the fresh air passes. Inlet and outlet ports are provided to allow hoses to be connected as needed.

15 Claims, 6 Drawing Sheets

MUFFLER HAVING ISOLATED DUAL FLOW BAFFLE STRUCTURE

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the invention

This invention relates to mufflers and particularly to mufflers having two baffles in one housing.

2. Description of the Prior Art

In modern small aircraft design, the muffler system consists of a single housing that is fitted with a pair of baffles. The two exhaust manifolds of an engine feed into this single muffler. FIG. 1 is an interior view of a typical prior art muffler. Here, the muffler housing 1 has two baffle elements 2 that connect to inlets 3. Exhaust gasses 4 enter the muffler from both sides of the housing as shown by the arrows. Once these gasses pass through the baffle elements 2, they outflow through the exhaust 5. Ideally, these gasses would pass from the baffles directly through the exhaust 5. However, in practice, these gasses circulate within the can as shown by the curved lines. This mixing of the exhaust gasses cause problems with engine performance. It causes increased back pressure, can reduce horse power and, under certain circumstances, can cause exhaust coming from one manifold to flow through the other manifold, back into another cylinder during valve overlap and when the exhaust valve is off its seat.

BRIEF DESCRIPTION OF THE INVENTION

The instant invention overcomes these problems. An exhaust has two isolated muffler elements (i.e., a baffle element covered by a "can") in one container (shroud). This allows the exhaust from one manifold to be muffled and exhausted independently of the other manifold's exhaust. Moreover, the muffler is the same size as existing mufflers, so that it fits into the space of the prior art mufflers. Using two independent muffler elements eliminates all of the problems discussed above and increases the engine horsepower without reducing efficiency. It is a true dual-exhaust system.

The outer shroud is also designed to act as a heat exchanger. Fresh air can be pulled through the shroud to be heated for cabin heat and for carburetor heat. The shroud, which surrounds the muffler elements, has space around the cans, through which the fresh air passes. Inlet and outlet ports are provided to allow hoses to be connected as needed.

DETAILED DESCRIPTION OF THE INVENTION

Figure 1:
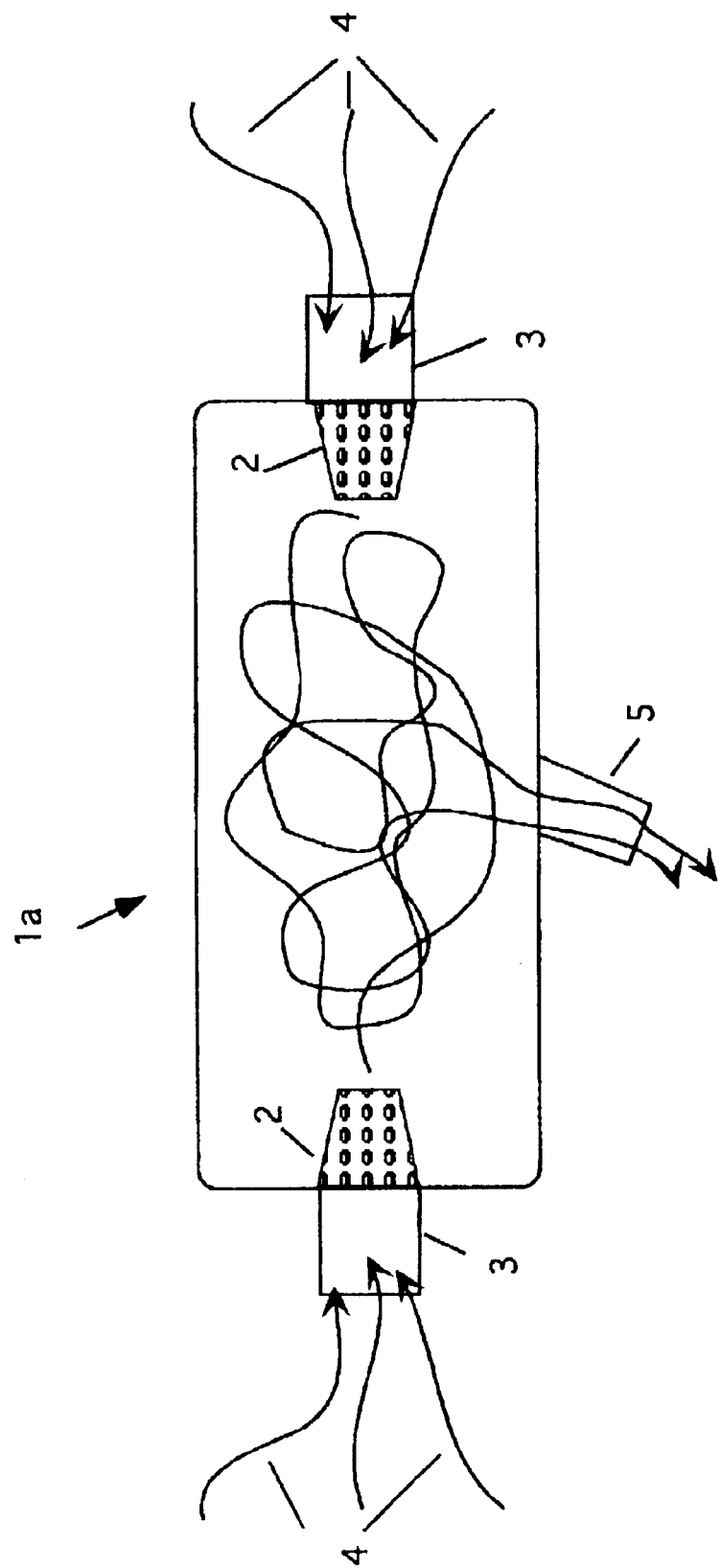
FIG. 1 is an interior view of a muffler as prior art.
Figure 2:
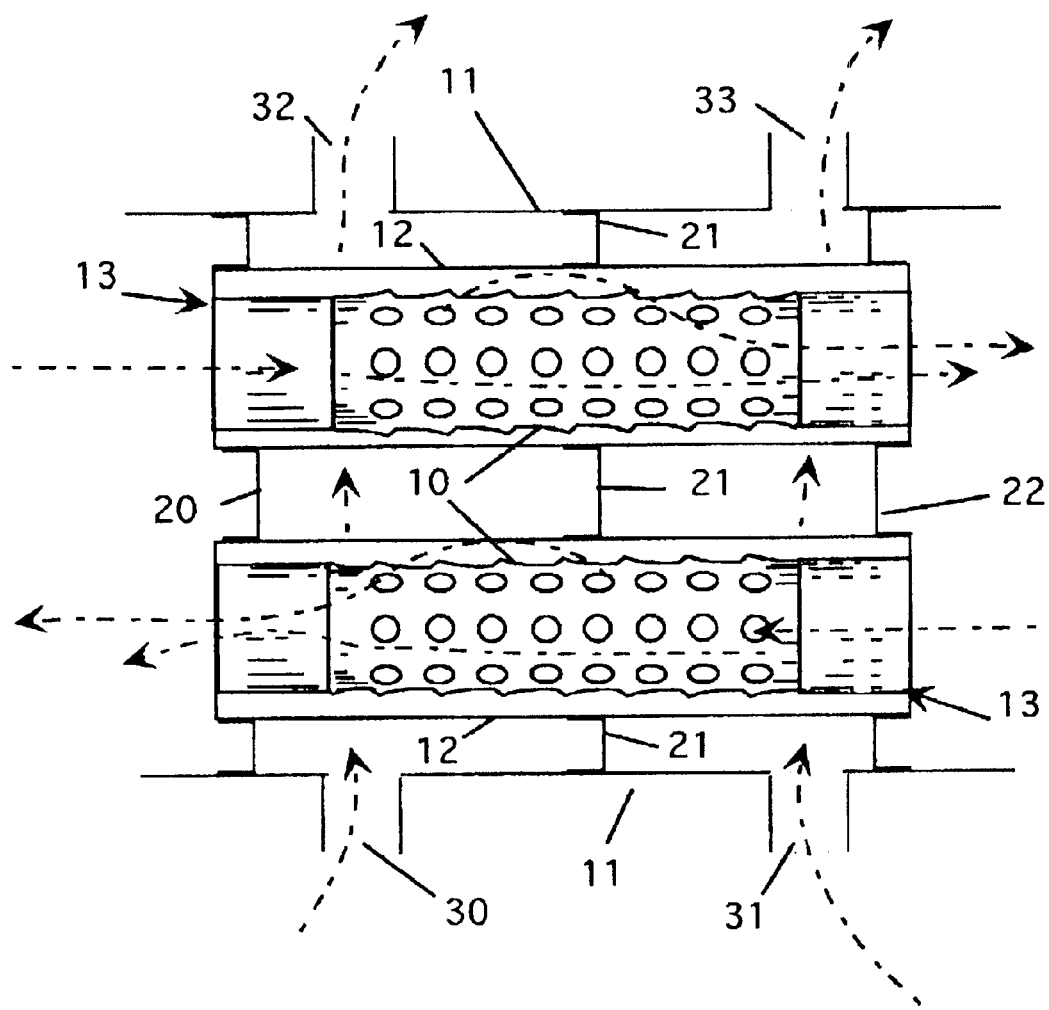
FIG. 2 is a cross-sectional view of the invention.
Figure 3:
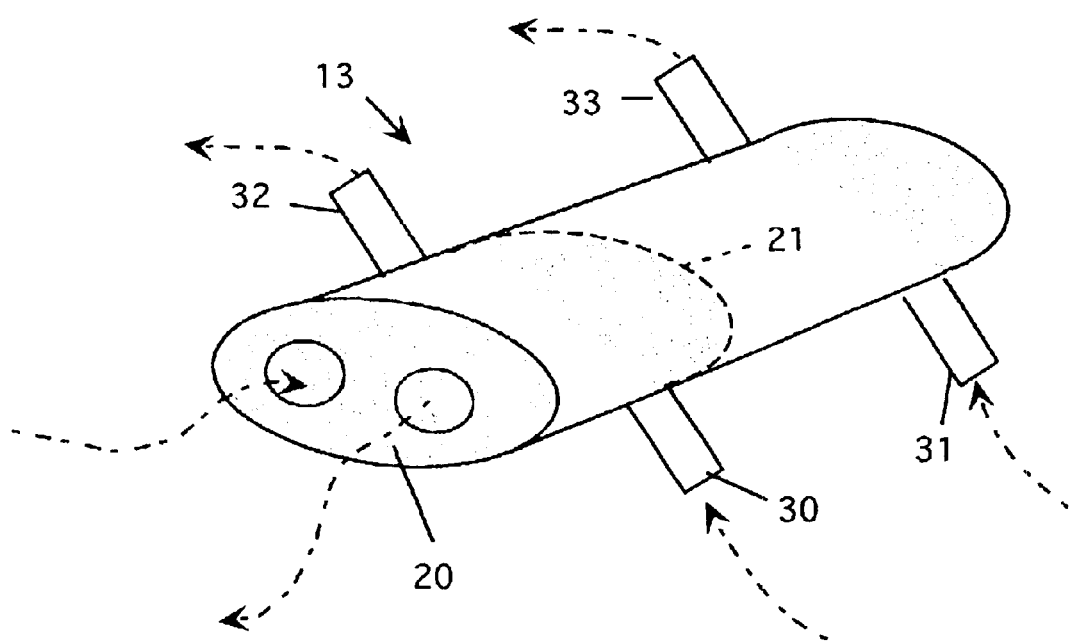
FIG. 3 is a perspective view of the invention.

Referring now to FIGS. 2 and 3, the invention consists of two separate mufflers in one package. The advantages of combining the two mufflers in one are: that it makes a smaller exhaust unit; the unit is capable of providing full cabin heat from one source; and the unit is arranged to provide a linear exhaust path, which reduces back pressure on the engine and provides more power.

As shown in FIG. 2, two muffler baffles 10 are shown. Each baffle 10 is fitted into a "can" 12. The muffler cans 12 are then surrounded by a shroud 11. The shroud seals the cans and prevents the escape of exhaust gasses from the muffler baffle into the shroud, which acts as a heat exchanger (discussed in more detail below). The combination of the baffles 10, cans 12 and the shroud 11 forms the muffler package 13. This package 13 is largely oval as shown in FIG. 3. One end of the shroud 11 is sealed with an end plate 20. The end plate 20 is welded to the edges of the cans 12 and to the shroud 11. A center plate 21 divides the space within the can. A second end plate 22 is) welded to the other end of the cans and shroud. This produces sealed unit as shown in FIG. 3. In this arrangement, the baffles and cans form two sealed units that contain the exhaust gasses. In the preferred embodiment, where an engine has two exhaust manifolds, the muffler is designed to have gasses from the first exhaust manifold flow into one end of the muffler and into one of the cans and the exhaust gasses from the second exhaust manifold flow into the opposite end of the muffler into the second can. Inside the shroud, the cans are sealed so that no exhaust gas enters the shroud heat exchanger portion.

Figure 4:
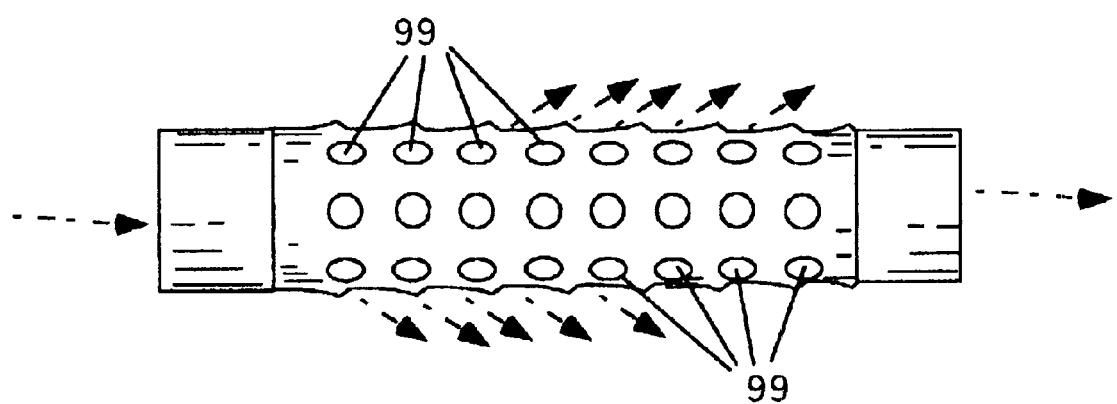
FIG. 4 is a detail view of a muffler element.

The heart of my dual muffler system is the baffle. FIG. 4 is a side detail of the muffler baffle. It has a number of angled holes 99 formed in the outer shell as shown. The holes 99 are formed in a "cheese grater" fashion. The holes are all angled toward the muffler can.

Figure 5:
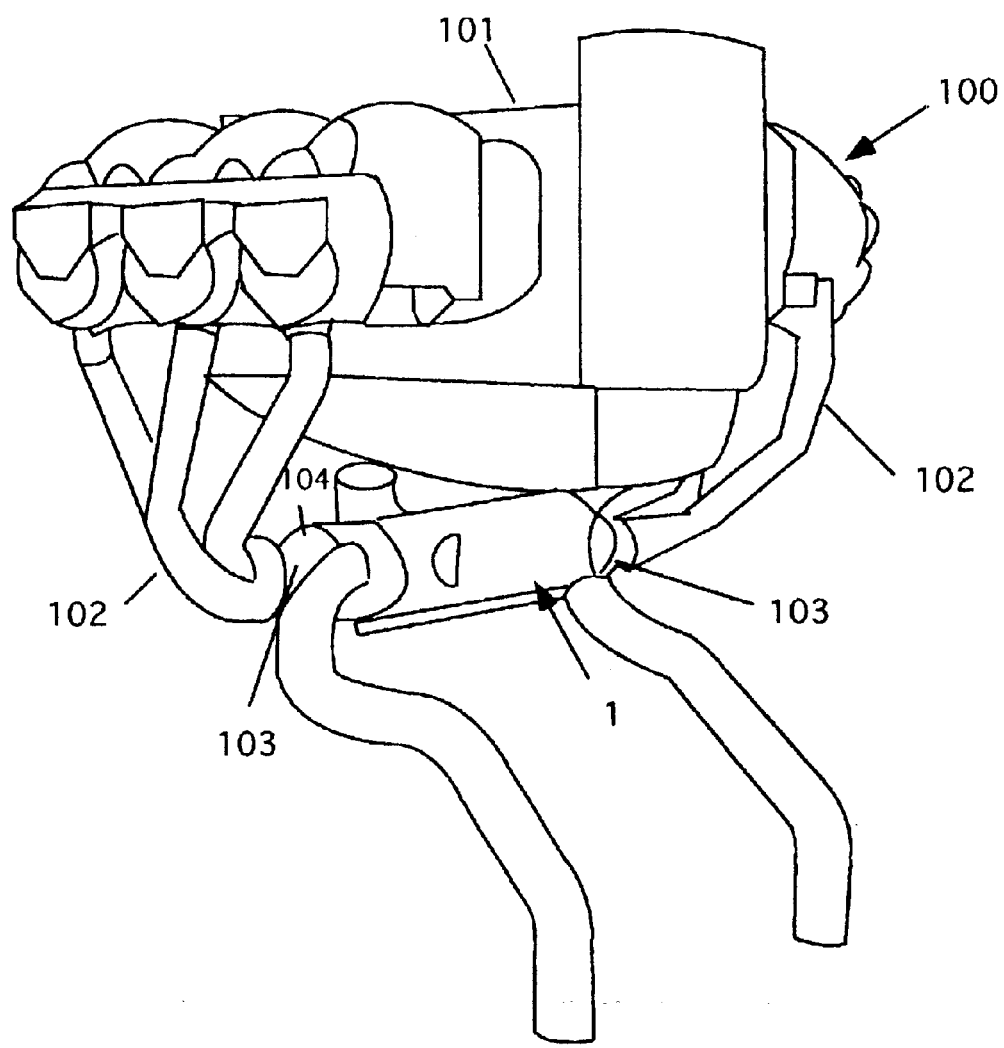
FIG. 5 is a perspective view of the invention installed under a typical aircraft engine.

The invention places two of these elements into one overall muffler unit, which allows the exhaust from each end of the engine to pass through them without mixing the exhaust in a single muffler element. As shown in FIG. 5, the muffler 1 is typically placed below the engine 100, perpendicular to the engine block 101. In this way, the inlet ports are aligned with the exhaust manifolds 102 coming down from the engine as shown. In the drawings, the exhaust manifolds 102 are brought together in my collector system 103, which is the subject of my U.S. Pat. No. 5,768,891. However, any similar collector system can be used (note that it must be able to conform to the manifold and muffler configurations). Each collector 103 has an outlet 104 that attaches to one of the inlet ports of the muffler cans.

As discussed above and as shown in FIG. 2, the unit is designed so that the baffles are reversed. Thus, the left side collector has an input on one side of the muffler, with the exhaust gas flow from left to right, while the right side collector attaches to the right side of the muffler, with an exhaust gas flow from right to left (see the directional arrows on FIG. 2). Because the muffler cans are sealed, these exhaust flows do not mix. Each exhaust gas flow passes through its own baffle and can and is exhausted out of the muffler independent of the other exhaust flow.

Figure 6:
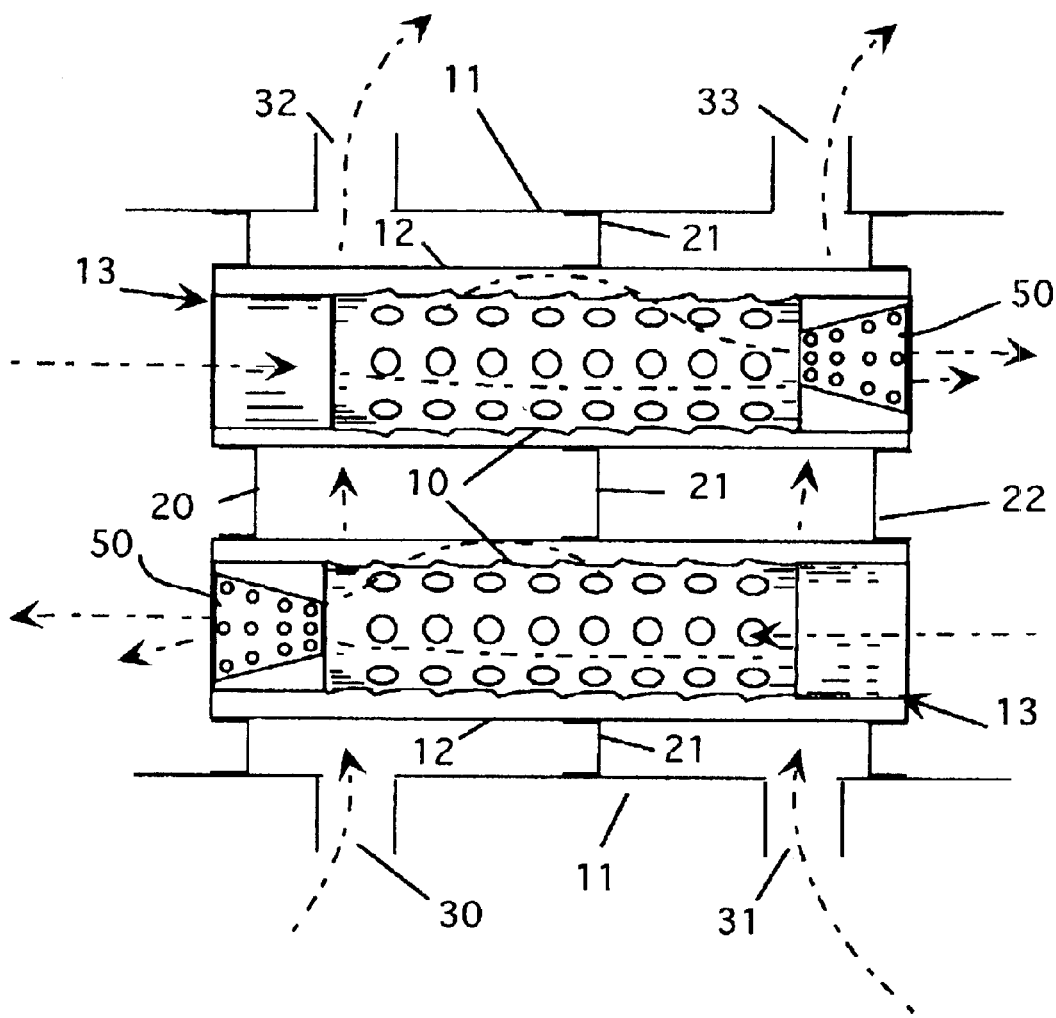
FIG. 6 is a cross-sectional view of the dual can muffler showing the alternative muffler elements in place and the airflow for cabin heat and carburetor heat.

FIG. 6 shows a modification to the device. Here, additional end baffles 50 are installed in the outlet end of main baffles. These baffles are placed in the ends of the main muffler elements as shown. These additional baffles 50 are used to provide further noise abatement. As before, there are two independent baffles, one for each side of the muffler.

As discussed above, the shroud 11 covers both cans and creates a heat exchanger around the cans. The double can muffler 1 allows air to flow through the unit to provide cabin and carburetor heat. As shown in FIG. 6, air enters the can from one of two inlet ports 30 or 31. This air passes over the muffler elements, where it is warmed. The air is then removed via two outlet ports 32 and 33: one for cabin heat and the other for carburetor heat. Note that the center plate 21 acts as the divider for the two airflows. This is done because cabin heat is often used separately from carburetor heat. Having the airflows separated makes controlling them simple and easy. As discussed above, the use of the shroud as a heat exchanger requires that the muffler cans be sealed so that exhaust gases do not mix with the cabin and carburetor heat air flows through the shroud.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A dual exhaust muffler comprising:
   a) an outer housing, having a first end and a second end, wherein said first end of said outer housing having a first inlet port and a first outlet port formed therein, and wherein said second end of said outer housing having a second inlet port and a second outlet port formed therein;
   b) a first muffler element, having an inlet end and an outlet end, fixedly installed within said outer housing and attached to the first inlet port and the second outlet port; and
   c) a second muffler element, having an inlet end and an outlet end, fixedly installed within said outer housing and attached to the second inlet port and first outlet port.

2. The muffler of claim 1 wherein the first inlet port is adjacent to said second outlet port.

3. The muffler of claim 1 wherein the second inlet port is adjacent to said first outlet port.

4. The muffler of claim 1 further comprising:
   a) a first exhaust manifold, having an outlet port and a first exhaust stream emanating from said first exhaust manifold;
   b) a second exhaust manifold, having an outlet port and a second exhaust stream emanating from said second exhaust manifold;
   c) whereby the exhaust stream emanating from said first exhaust port enters said outer housing from said first end and the exhaust stream emanating from said second exhaust manifold enters said outer housing from said second end and further such that the first exhaust stream and the second exhaust streams pass through said first and second muffler elements without mixing within said outer housing.

5. The muffler of claim 1 further comprising:
   a) an air inlet port, formed in said outer housing, said air inlet port allowing the entry of a cool air supply into said outer housing;
   b) a means for heating said supply of cool air, producing a supply of heated air, installed in said outer housing; and
   c) an air outlet port formed in said out housing to permit the supply of heated air to exit said outer housing.

6. The muffler of claim 5 wherein the means for heating the supply of cool air comprise the first and second muffler elements.

7. The muffler of claim 5 wherein the supply of heated air exiting from said air outlet port is used to heat an aircraft cabin.

8. The muffler of claim 5 wherein the supply of heated air exiting from said air outlet port is used to heat an aircraft carburetor.

9. The muffler of claim 5 further comprising:
   a) a second air inlet port, formed in said outer housing, said second air inlet port allowing the entry of a second supply of cool air into said outer housing;
   b) a means for heating said second supply of cool air, producing a second supply of heated air, installed in said outer housing;
   c) a second air outlet port formed in said outer housing to permit the second supply of heated air to exit said outer housing; and
   d) a divider plate, fixedly installed within said outer housing, and being placed between said first air inlet and outlet ports and said second air inlet and outlet ports.

10. The muffler of claim 9 wherein:
    a) the supply of heated air exiting from the sir outlet port is used to heat an aircraft cabin; and
    b) the second supply of heated air, exiting from said second air outlet port is used to heat an aircraft carburetor.

11. The muffler of claim 1 wherein the first and second muffler elements comprise a baffle element, having an inlet end and an outlet end, and an outer can.

12. The muffler of claim 11 wherein the baffle elements have a plurality of angled holes formed in them.

13. The muffler of claim 12 wherein the plurality of angled holes formed in said first and second baffle elements are all angled toward the input air flow of each baffle element respectively.

14. The muffler of claim 11 wherein said each of said muffler elements further comprises an end baffle, fixedly installed in the outlet end of each of said baffle elements.

15. The muffler of claim 11 wherein each can of each of said muffler elements is sealably attached to said outer housing to prevent the escape of exhaust gasses into said outer housing.

* * * * *